April 18, 1967 — S. L. LEACH — 3,314,179
DISPLAY APPARATUS
Filed April 5, 1965 — 3 Sheets-Sheet 1
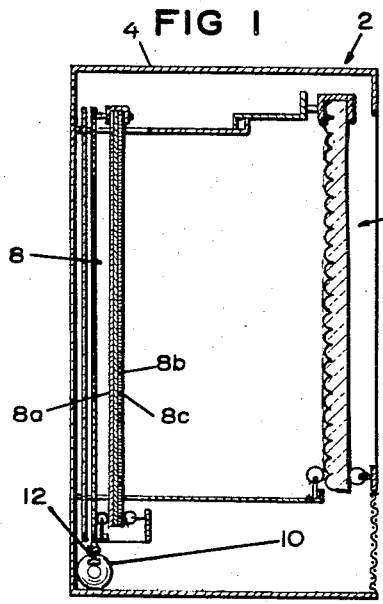
FIG 1
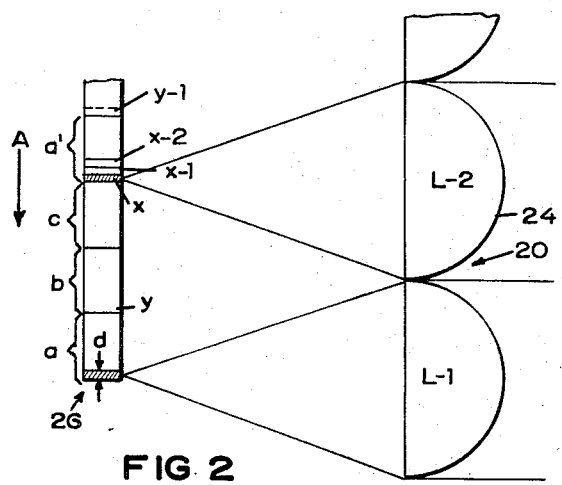
FIG 2
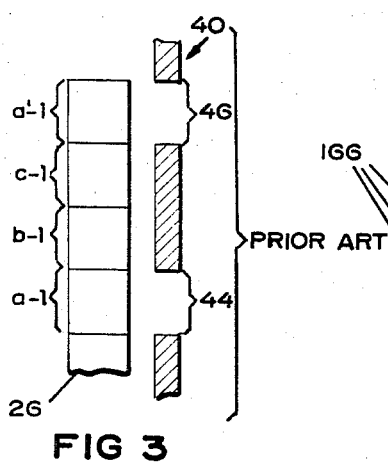
FIG 3 — PRIOR ART
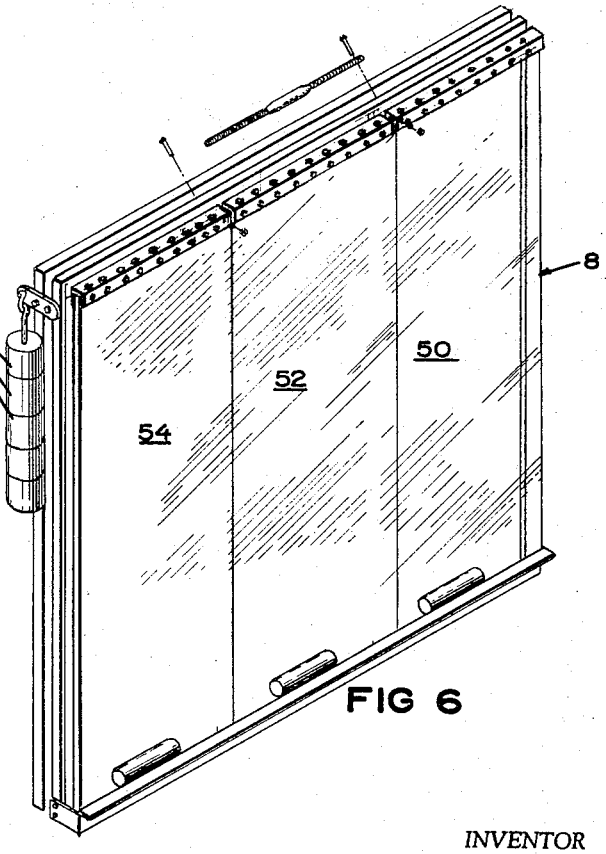
FIG 6
INVENTOR
Sam L. Leach
BY *Jacobi & Davidson*
ATTORNEYS April 18, 1967 S. L. LEACH 3,314,179
DISPLAY APPARATUS
Filed April 5, 1965 3 Sheets-Sheet 2
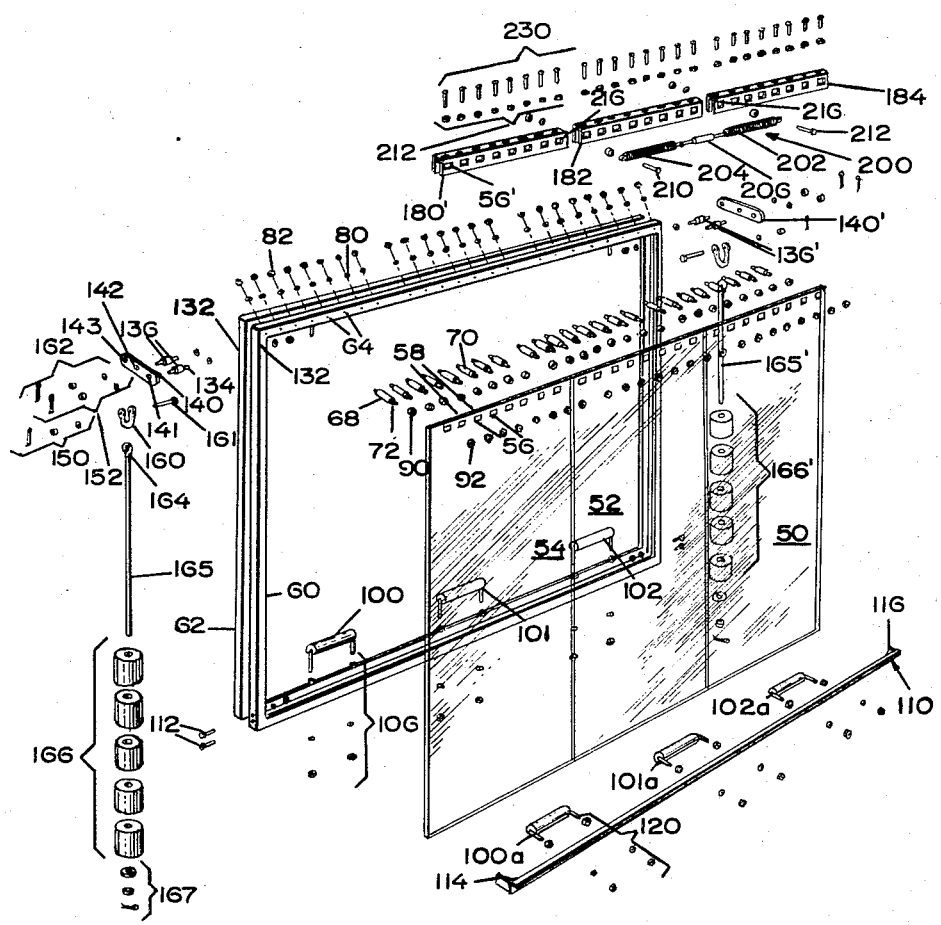
INVENTOR
Sam L. Leach
BY
ATTORNEYS

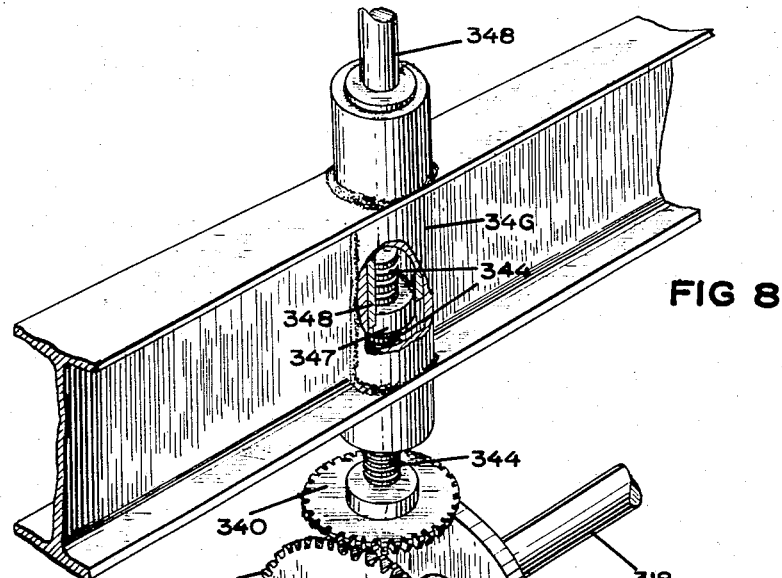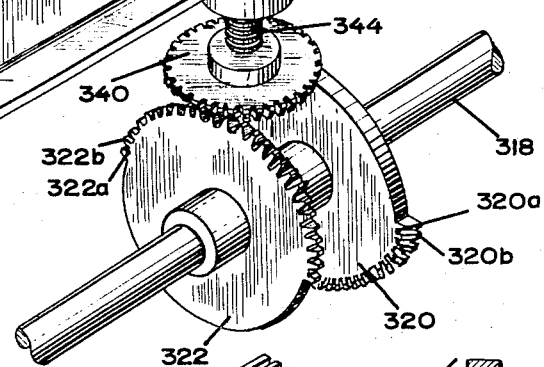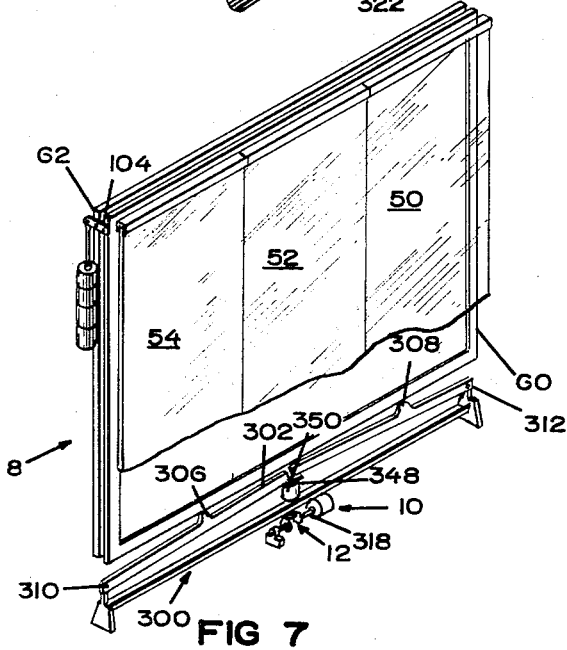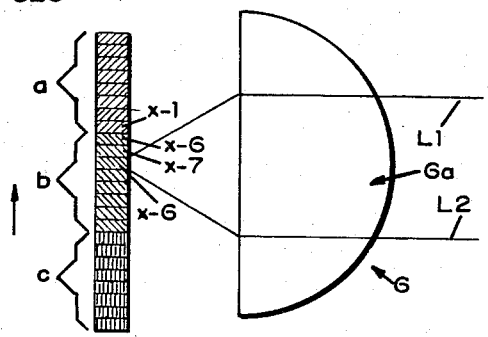

3,314,179
DISPLAY APPARATUS
Sam L. Leach, 400 Veteran Ave.,
Los Angeles, Calif. 90024
Filed Apr. 5, 1965, Ser. No. 445,588
8 Claims. (Cl. 40—137)

This invention relates to display apparatus, and is particularly concerned with display apparatus capable of presenting two or more displays through use of a single combination of components.

While the invention is not limited to outdoor bulletin type display boards, the invention does find particular utility in such application, and accordingly, the same is considered in this environment hereinafter. It will be understood, however, that the principles of the invention have application in various types of displays, including indoor displays, transit advertising, counter top displays, and the like.

At the present time, the space available for advertising displays is being somewhat limited in the more desirable areas. In particular, and again by way of example, it is common practice on present federal highways to preclude the use of any substantial number of bulletin board displays. Moreover, city and county ordinances are presently tending to limit the number of display areas available in any community in an endeavor to maintain property values in residential neighborhoods. Even further, modern design and architecture, coupled with committees concerned with the aesthetic aspects of public buildings, present additional limitations on the use of relatively large indoor displays.

The preceding mentioned factors, as well as various other factors, tend to increase the cost of advertising display space, thus affecting the number of displays which can be maintained by a display organization, and in turn, the cost of displays which can be used, from the practical standpoint, by an advertiser itself. Because of such circumstances, the display advertising industry has been in constant search of a suitable displayly apparatus which will present a series of advertisements in a single location, in order to effectively multiply the number of displays and reduce the cost for each display.

Various suggestions have previously been made with respect to the manner in which a number of displays can be presented at a single location and/or through use of a single unit. In one of the more simplified arrangements, two series of strip like panels are arranged in juxtaposition such that one series of strip panels can slide over the other series of strip panels to present two different displays. The arrangement is mechanically operated, and due to the frictional engagement between respective strip panels and the resultant wear, this type unit has a relatively short life. Moreover, and of equal importance, is the fact that problems are encountered with this type of unit if an attempt is made to use the same in large displays and/or outdoors. The larger the display, the more serious the wear and warping hazards become, and if an attempt is made to use this type of display outdoors, it is essentially necessary to place the display in a hermetically sealed housing.

Another relatively simple approach to the display problem which has been suggested concerns the use of an endless loop or web having respective displays presented thereon. Such web, according to this suggestion, is supported by a pair of spaced apart rollers, and the web is driven whereby respective display areas are presented through a viewing opening. In this instance, the respective displays must either be intermittently moved into position, with a delay between resultant displays, or continuously moved whereby a viewer only is presented with an instantaneous full presentation of a given advertisement.

In some of the more sophisticated suggestions which have previously been made, a so-called "pictorial parallax panoramagram" is incorporated. Pictorial parallax panoramagrams include a lenticular screen and an image layer wherein the image layer is fixed in relation to the lenticular screen. Through pivotal or rotary movement of the lenticular screen-image layer combination, a viewer is presented with changing pictures. However, severe limitations are placed on the use of these units because it is essentially necessary to provide a different screen for each image layer, and because the angle at which the unit must be viewed for proper presentation is substantially limited. Moreover, with this type of arrangement, comparatively quick movement of the overall lenticular screen-image layer assembly is required to present different advertisements to the same viewer, particularly if the viewer is moving.

Appreciating the problems attendant to the other suggestions mentioned above, the industry concerned with sizable displays has more recently concentrated its effort on arrangements whereby a series of vertically extending triangular bodies are arranged in parallel relation. Drive means are incorporated in the assembly for rotating the triangular bodies to first, second and third positions, with a "dwell time" being provided at each position. The triangular bodies respectively carry sections of a given advertisement and/or display so that when synchronized, one side of each triangular body is in a given position and such sides cumulatively present a first display, then each triangular body is moved to a second position wherein another side of each body is so located and these sides cumulatively present a second display, and thereafter, the sequence is repeated so that a third display is presented before the first display is again viewable. Even though an arrangement incorporating triangular bodies and operating in this manner has met with some commercial success, the industry has faced some substantial problems in connection therewith. For example, there is considerable time delay required to rotate the triangular bodies from position to position. In a practical application, a given display may be presented for a period of eight seconds, and for a period of six seconds thereafter, the triangular bodies are moving to a new position. Thus, with minimum times being used, such as those mentioned in the preceding sentence, substantially half of the viewing time is wasted while the unit is changing from one display to another. Furthermore, in large units, and particularly in outdoor units where the overall display must withstand environmental wind, rain, and snow conditions, the triangular bodies are relatively heavy, and the operating mechanisms therefor are in turn subjected to a substantial load. Commonly, the weight and load factors result in considerable vibration of the overall assembly, and thus, constant maintenance and repair are required.

It should be apparent from the preceding brief, but not exhaustive, discussion of the prior suggestions and assemblies which have been used for display purposes that there remains a need for a display apparatus which is capable of presenting a series of different advertisements but which (1) is not subject to wasted time delays between successive presentations, (2) is free of wear, friction, and like problems requiring constant maintenance and repair, (3) is sufficiently inexpensive to find widespread commercial application, and (4) can be made in relatively large size. The primary object of the present invention is to satisfy such need.

More particularly, it is an object of the present invention to provide a display apparatus which is capable of quickly changing from presentation to presentation, which is durable in operation, which can have a display area of substantial size, if desired, and which has minimum dimensions other than in the display area itself. Consistently, it is an object of the present invention to provide such a display apparatus which utilizes a lenticular screen element, a lenticular or lineated image element, and means for moving one of the elements relative to the other whereby a successive series of two or more advertisements or presentations can be seen by a viewer with no appreciable delay time therebetween and, within reasonable limits, regardless of the position of the viewer with respect to the forward face of the display.

To those familiar with the pictorial parallax panoramagram art, it is known that lenticular screens essentially consisting of a plurality of adjacent parallel elongated lenses can be used with lineated image layers to produce one of two effects; namely, (1) a changing picture, and (2) a three-dimensional illusion. Whether the unit be of the three-dimensional type or of the changeable picture type, basically the same principles are involved. Specifically, the elongated lenses or lenticles focus on an underlying image strip. In the changeable picture units heretofore provided, successive image strips carry images of successive different objects. With the three-dimensional type units, successive image strips carry individually views of a given object as taken from successive points of view along a given arc disposed forwardly of the object or objects.

The image layers, following their lineated or lenticular formation were, consistent with prior techniques, aligned behind a lenticular screen so as to achieve the desired optical effect. Depending on the viewing angle or position of the viewer, and/or depending on the position of the lenticular screen relative to the lineated image layer, a viewer saw either a presentation having three-dimensional characteristics, or one of two or more displays, or if not properly aligned, a distored presentation. Where the lenticular screen units were made with the lineated image layer actually fixed in direct relation on or with respect to a lenticular screen, it was possible to obtain good displays provided the observer viewed the same from a given angle and/or provided the displays were of comparatively small size whereby they could be held in a human hand, for example. However, viewing a given display from a particular viewing angle and/or providing a relatively small display which can be held in the hand necessarily limits utilization of the device, and in any event, does not render it particularly suitable for large displays which are to be viewed by various persons walking in an airport, riding in a car, or the like.

To adapt the lenticular screen and lineated image principles mentioned above to larger displays, one prior approach taken by the present applicant in his copending application, Ser. No. 354,037, filed Mar. 23, 1964, now abandoned, contemplated utilizing a lenticular screen element and a lineated image element and moving one of the elements relative to the other. Specifically, with this approach, one of the elements would be moved through a finite distance by a cam-lifting arrangement, for example, so that one display was then presented. Thereafter, and virtually instantaneously, the movable element would again be shifted through another equal finite distance, and another display would be presented. This sequence would be continued with the moving mechanism essentially operating to perform intermittent finite movements shifting either the lenticular screen or the lineated image through a relatively small distance whereby the display, when viewed from a substantial distance, would successively change its presentation. Two severe limits were imposed on this type arrangement. First, the desired effect was only obtained when the viewer was located at a substantial distance from the display, namely, infinity for optical purposes. This being the case, the display lost its effectiveness as the viewer approached the same, and the information which could be presented by the display was necessarily limited to information or indicia which could be viewed from the substantial distance. Relatively small printing, in other words, was prohibited. Secondly, and of equal importance, the operating mechanism had to be considered, at best, as delicate. Shifting any given sizable element through a finite distance on repeated operations presents practical problems from the wear standpoint as well as from the alignment standpoint. While the unit may function satisfactorily for extended periods of time in comparatively small application, i.e., units having a maximum dimension of the order of one or two feet, the satisfactory operation cannot be anticipated when the display unit has dimensions of the order of thirty or forty feet in one direction.

Realizing the foregoing, the present invention contemplates the use of a lenticular screen and a lineated image layer in such a manner as to eliminate both the mechanical operating problems and the viewing angle problems. Specifically, in contrast with prior suggestions, the present invention utilizes a lenticular screen element and a lineated image element, but the lineated image element is specially constructed, and the operating mechanism for the unit, in turn, is operated to provide continuous movement of one of the elements. The motion problems previously experienced are thus overcome, and by virtue of the configuration of the lineated image, the viewing angle is substantially expanded from the practical standpoint.

As mentioned above, the previously suggested lineated image layers might be regarded as incorporating a series of successively adjacent strips. With changeable picture type units, alternate strips would carry image portions of a given object, and the in between strips would carry images of a different object. There was but one image on each given strip, however. In contrast with this arrangement, and to appreciate the difference between prior lineated image layers and the image element of the present invention, we can assume that the lineated image layer again consists of a series of strips. However, whereas a given strip in prior units would carry a single image portion of a given object, the same strip, consistent herewith, would carry a plurality of image portions of such object. Thus, the strips themselves do not constitute image portions, as with prior developments, but instead, the strips constitute a series of images, or each strip itself might be regarded as comprising a plurality of strips of the type used in prior units.

Since each strip is essentially subdivided into a series of narrower strips, or as they are called, "lines," an observer is not limited to a single position and/or single viewing angle to see a clear presentation. Instead, he is afforded the advantage of being able to see the desired presentation more or less without regard to his exact position and/or viewing angle. If the observer is moving, for example, in a car, his reaction is not sufficiently fast to notice any change in a presentation as he moves from position to position and in turn alters his viewing angle of the same presentation.

The use of a plurality of image lines within a given image strip moreover and most importantly, permits one of the elements, namely, the lenticular screen element or the image element, to be moved relative to the other in a continuous seqence or in a continuous path whereby respectively different presentations are presented to an observer. The movement preferably continues from a lower position to an upper position, and then returns from the upper position continuously to the lower position, for a repeat operation. During the movement, if an observer is at a given location for example there would, in fact, be a series of successive presentations; however, the observer would not realize the successive series since the change is made between respective images of the same object at such a speed as to create in the mind of the observer a single presentation. This effect might be deemed analogous to that which is achieved with motion picture films where the successive frames are moved into position at sufficient speed to create the illusion of but a single picture. While the analogy is helpful in understanding the invention, it must be understood that with a motion picture film, the desired end result is to obtain a proper display of motion of the objects being viewed, whereas with the present invention stability of a single display and/or presentation of a single display is the ultimate desired result.

With the unit hereof, as the lenticular screen, and/or image element is continuously moved in a scanning manner with respect to the other element, the optical effect is a stable presentation of a first display for a predetermined time, and immediately thereafter a stable presentation of another display for a further predetermined time. There is essentially no delay between respective presentations, as the movement of the movable element completes its scan of one area and enters into the scan of an adjacent area. In fact, it has been found that there is an instantaneous blending during the continuous scan operation as the scan passes through the junction between successive areas.

The invention resides in the display apparatus itself, in the combination of components incorporated therein, in the method of operation, and in the construction of an image layer used therewith. The invention will be better understood and objects other than those specifically set forth above will become apparent when consideration is given to the following detailed description. Such description makes reference to the annexed drawings presenting preferred and illustrative embodiments of the invention.

In the drawings:

FIGURE 1 is a side sectional view of one form of apparatus constructed in accordance with the present invention;

FIGURE 2 is a schematic illustration of the manner in which an image layer is made in accordance herewith;

FIGURE 3 is a schematic illustration of the manner in which image layers have been made in accordance with prior art techniques;

FIGURE 4 is a perspective exploded view of the preferred form of image element support utilized in the apparatus of FIGURE 1;

FIGURE 5 is a fragmental detailed view showing the cooperation and disposition between a frame member and a roller used in the arrangement of FIGURE 4;

FIGURE 6 is a perspective view of an image element support as assembled and constructed according to FIGURE 4;

FIGURE 7 is a perspective view of an image element support as associated with a preferred form of moving means associated therewith;

FIGURE 8 is a fragmental detailed view of the gear portion of the moving means and associated components shown in FIGURE 7; and, FIGURE 9 is an enlarged schematic fragmental view of a lens element and cooperating image layer constructed in accordance herewith.

Referring now more specifically to the drawings, and in particular to FIGURE 1, it will be noted that the unit shown therein is generally designated by the numeral 2. This unit includes a housing 4 having disposed therein a lenticular screen element 6 and an image element 8. Also within the housing is a motor 10 coupled with a drive arrangement 12 which is adapted to move the image element 8 in a manner explained more fully hereinafter. The particular construction of the housing 4, the particular type of motor 10, and like details are merely shown in FIGURE 1 for purposes of illustration. Any housing can be used and virtually any motor can be used. The important factor so far as the present description is concerned regards the construction of the image layer or element, the use of a lenticular screen element in association therewith, the manner of support of such elements, the means for moving one element with respect to the other, the relative placement of the elements with respect to one another, and the relative environmental effects on respective elements. The relative environmental effects on the image element and the lenticular screen element, and the relative movement therebetween are considered initially, at least generally, so that certain aspects and/or variations will be understood to have application to the preferred embodiment discussed hereinafter, as well as modifications thereof within the scope of the present invention.

Specifically with regard to the image element 8, it will be noted that the same, as shown in FIGURE 1, includes a fixed support panel means 8a, a movable support panel means 8b, and an image carrying layer or film 8c. The image carrying layer or film 8c is secured to the movable panel means 8b preferably by a contact pressure-sensitive type adhesive. The adhesive should have sufficient strength properties to permit the film 8c to be fixed in direct and smooth contact with the panel means 8b and also, to insure that the film 8c expands and contracts with thermal expansion and contraction of the panel means 8b, and humidity expansion and contraction of the panel means 8b, should the same occur. Additionally, the lenticular screen element 6 and the movable panel means 8b should be constructed of materials having the same thermal coefficient of expansion, at least, and preferably the same humidity coefficient of expansion. Utilizing materials for the lenticular screen element and the movable panel means 8a which have these corresponding coefficients of expansion, and further supporting the respective lenticular screen and image elements in the manner hereinafter specified insures proper continuous parallelism as required and furthermore, proper dimensional relationship between the width of a given series of field sections on the image layer and the width of a lenticle in the lenticular screen. Preferred materials for use in the movable panel means 8b and the lenticular screen are set forth in applicant's copending prior application Ser. No. 354,037, filed Mar. 23, 1964, now abandoned.

Regarding relative movement, the preferred embodiment contemplates moving the image layer with respect to the lenticular screen. However, the invention can be applied with virtually the same result, although probably not the same practical advantages, if the lenticular screen element is made movable with respect to the image element, rather than moving the image element with respect to the lenticular screen element.

Bearing in mind the foregoing, attention is now directed to FIGURE 2, and specifically to the manner in which the image element utilized in a construction made in accordance herewith is formed. Schematically shown in FIGURE 2 is a fragmental portion of a lenticular screen 6 including respective lenticles 22 and 24. Also shown in FIGURE 2 is a film 26 having a photo-sensitive emulsion thereon. The film 26, as presented, is actually much thicker than the film would be in practice, and similarly, the size and exact configuration of the lenticles 22 and 24 are enlarged and possibly somewhat distorted, for explanatory purposes. However, the technique of utilizing a lenticular screen in front of a film with a photosensitive emulsion thereon is known to the art of making parallax panoramagram units with a three-dimensional effect, and accordingly, FIGURE 2 should be readily understood from the schematic presentation.

In practice, a film such as the film 26 and a lenticular screen such as the screen 20 would be mounted in a suitable camera. A field of view, including one or more objects, would be placed in front of the camera and the camera lens system would be adjusted to properly direct the light to the lenticular screen 20 from the field. The lenticular screen would be disposed in front of the film 26 essentially by a distance equal to the focal length of the respective lenticles 22 and 24, which focal length would be the same for all lenticles in the screen. It has been found that regardless of the lentical focal length, regardless of the lenticle width, and basically regardless of the lenticle configuration, the smallest resolution which can be obtained at the focal point is of the order of .00065 inch, i.e., the distance $d$ as shown in FIGURE 2 is of the order of .00065 inch with proper focus of the lenticular screen with respect to the film and photo-sensitive emulsion thereon. Initially, therefore, when the camera system with the lenticular screen therein is exposed to a field, small areas $x$ are exposed on the film at spaced apart locations. Specifically, in FIGURE 2, the areas $x$ and $x-1$ are shown as falling within the boundaries of the larger bracketed areas designated $a$ and $a'$.

Consistent herewith, the camera itself is maintained in fixed position relative to such field. However, the film 26 is moved in the direction of arrow A at a rate whereby the entire areas $a$ and $a'$ essentially scan the field. While it would seem that with continuous movement, as contemplated hereby, there would be some visible overlap in the respective areas $x-1$, $x-2$, etc. as the film progressed in its movement, it has been found that the resolution of the emulsion and the overlap involved actually is not visibly detectable either on the negative as developed, or on enlarged reproductions thereof. To the contrary, by following this technique, it has been found that each small section $x$, $x-1$, $x-2$, etc. contains a sufficiently clear individual image of the field being viewed. With the preferred arrangement contemplated by the present invention, a series of these small image lines or strips, $x-1$, $x-2$, etc. are provided in each area $a$. After the area $a$ has been filled, i.e., after the film has been moved through a distance whereby the areas $a$, $a'$, etc. have been scanned, then the camera is essentially "closed" and a new field is placed in position to be viewed by the camera. The new field, like the original field, can consist of any desirable type of information, any arrangement of devices or the like.

Once the new field has been placed in position, the film 26 would have been moved to a point where the respective areas $y$, $y-1$, etc. occupy the identical position previously occupied at the start of the operation by the small areas $x$, $x-1$, etc. The operation would then be repeated until the larger area $b$ was scanned behind the lenticle, and when this operation was completed, such larger area $b$ would contain a plurality of image strips or lines of the same field, which field, according to the example used for purposes of this description, would be different from the field scanned during the time that this larger area $a$ was being exposed. When exposure of the larger area $b$ was completed, the camera would again be "closed" and a new field would be repeated whereby the larger area $c$ would scan the newest object in position.

As a result of the preceding operation, the respective areas or field sections $a$, $b$, and $c$, and the successively adjacent series of field sections $a'$, $b'$, and $c'$, etc. would each contain a series of image sections of a field, with the image sections in each field section carrying images of the same field, but with the field of the image sections of field section $b$ and section $c$ being different from each other and those of field section $a$ in this example. For illustrative purposes, it has been assumed that only three different pictures are to be ultimately presented by the display device hereof. Thus, only sections $a$, $b$, and $c$ have been explained. If only two pictures were ultimately to be presented by the display device, then and in that event, there would merely be two exposures of the sections $a$ and $b$ successively, with each of such section being increased in dimension so as to cumulatively alone cover an area having a width equal to the width of a lentical of the screen. Alternatively, if four, five, or more pictures were ultimately to be displayed by the device hereof, then the section $a$ would be reduced in size, the section $b$ would be reduced in size, the section $c$ would be reduced in size, and there would be room for an additional section $d$ containing successive like images of the same field of view.

To understand the significant difference between an image layer or element made in accordance with the preceding discussion and an image layer made in accordance with prior art techniques for changeable pictures, attention is directed to FIGURE 3. In FIGURE 3, it is assumed that three separate images are to be presented by a changeable picture unit. A photo-sensitive film is used in this instance, which film corresponds identically with the film 26. However, as opposed to using a lenticular screen 20, a grid 40 would be used. This grid would include a series of openings 44 and 46 having a width equal to the width of one section of the film—i.e., having a width equal to the width of the sections $a-1$, $b-1$, $c-1$, etc. The grid 40 is opaque, other than in the areas 44 and 46. Thus, when the arrangement is assembled in a camera in the manner explained previously in connection with FIGURE 2, and when thereafter a view is made of an object, the entire sections $a-1$ and $a'-1$ are exposed to a given field. Thereafter, the grid 40 would be moved so that the areas $a-1$ and $a'-1$ were blocked, a new field would be put in position, and for example, sections $b-1$, etc. would be exposed in their entirety. The changeable picture unit would thus include successive field sections containing a single image of differing objects, rather than successive sections, each containing a plurality of images of the same field. This distinction is particularly important to the present invention because it is this distinction which permits the display apparatus hereof to achieve the advantages heretofore stated.

Having now explained the manner in which a negative is made for an image element constructed in accordance herewith, we can turn to the ultimate image element or layer. In this regard, it should be first noted, that following exposure of the film with the photo-sensitive emulsion thereon, the same is removed from a camera and developed according to conventional techniques. The film may have an emulsion thereon sensitive merely to black and white or color sensitive, but in either instance, the film is conventional and the processing techniques are conventional. After the film has been developed, it serves as a negative for the final unit.

In the normal instance, the ultimate image layer or element would constitute an enlargement made from such negative. If black and white film is used, a mere enlargement may in and of itself be sufficient, or alternatively, a printing plate may be made therefrom, according to conventional practice, whereby the image layer or element can be reproduced in quantity. If a color emulsion is used, a color separation may be made from the negative initially, and thereafter, enlarged color prints can be produced. In this latter instance, as in the former instance, the color techniques would be conventional, and there would be merely an ultimate positive, either of the same size of the negative, depending on the ultimate unit, or in the usual case, of substantial larger size than the initial negative. Still, the image layer itself constitutes a successive series of sections, each of which sections carries a plurality of images of a given object, and with the object which is the subject of the images in one section being different than the object which is the subject of the images in the next successive section. In regular order, however, field sections carrying the same image sections are repeated in sequence.

For relatively larger displays, it proves impractical to make enlargements of an image on a single sheet or web. Accordingly, it has been found desirable, in many applications, to make the images from the negatives in three sections and to mount these sections on a suitable backing. Thus, as shown in FIGURE 4, a suitable support for an ultimate display apparatus of substantial size, i.e., of the order of twenty or thirty feet, includes a plurality of panels 50, 52 and 54 disposed in side-by-side relation, with each of the panels being elongated. The panels 50, 52, and 54 each have disposed along their upper edges a series of generally rectangular openings, apertures, or slots 56, and communicating with each of the slots 56 is a threaded aperture 58.

Since the sheets 50, 52 and 54 are preferably formed of a plastic or the like, it has been found desirable to utilize a plurality of protector channel elements 180', 182, and 184, each of which is individually associated with one of the panels 54, 52 and 50. The channel member 180 has slots therein 56' which are aligned with the slots 56 and panel 54 and similarly, the channel members 182 and 184 have corresponding slots therein for alignment with the slots in the upper portions of panels 50 and 52. Also, cooperating with the panels 50–54 are a pair of frame members 60 and 62. The frame member 60 has a plurality of apertures 64 in the upper part thereof, and these apertures 64 are generally disposed for alignment with the slots 56 and 56'. A group of shoulder lugs 68 having opposed threaded end portions 70 and 72 cooperate with the threaded apertures 64 and the slots 56. Specifically, each of the shoulder bolts 68 has its end 70 passing through one of the apertures 64 and secured in position by means of a washer 80 and a nut 82. The central enlarged portion of each of the shoulder bolts 68 receives thereon a sleeve 90, and thereafter the shoulder bolt is passed through the apertures 56 and 56'. Then, another nut 92 is fastened on the external end 72 of the shoulder bolt to secure the unit in place. With this arrangement, and when all shoulder bolts 68 are in position, respective panels 50, 52 and 54 are permitted to move laterally with respect to one another, i.e., lateral expansion of the entire board is permitted because the diameter of the central section of the shoulder bolts 58 is substantially less than the length of the slots 56. Furthermore, some vertical adjustment in this area may be permitted, although the vertical adjustment, as explained more fully below, is accomplished primarily by other means.

Before assemblying the panels 50, 52 onto the frame member 60, a series of rollers 100, 101 and 102 are fixed in position by means of bolts and washers, cumulatively 106, whereby the rollers 100, 101 and 102 have a peripheral portion projecting slightly in front of the frame 60. More specifically, as shown in FIGURE 5, the frame 60 has a lower member 61 which is of right angle configuration. The roller 100 is supported on the member 61 such that the periphery thereof extends slightly beyond the front face of the member 61. Thus, such peripheral portion is in a position to engage the panel 54. A similar situation exists with respect to the panels 52 and 50 for engagement with the rollers 101 and 102.

Before or after the panels are placed in position and in engagement with the rollers 100, 101 and 102, a front frame member 110 is fixed in position by fastening the screws, cumulatively 112, extending through the rearwardly extending flanges 114 and 116 into the frame member 60 on opposite sides thereof. The member 110 carries thereon another series of rollers 100a, 101a, and 102a which are disposed opposite the rollers 100, 101 and 102 in the ultimate unit. The rollers 100a, 101a and 102a are fastened onto the member 110 by means of nuts and bolts, cumulatively 120.

The frame 60 is connected with the frame 62 by means of a counter-balancing weight arrangement. To this end, each of the frame members 60 and 62 have apertures 132 respectively in opposite ends thereof, which apertures receive the threaded ends 134 of shoulder lugs 136. The shoulder lugs, in turn, receive a pivot arm 140 which has apertures 141, 142 and 143 therein. The opposite end of shoulder bolts 136 pass through the respective apertures 141 and 142, and nuts and washers, cumulatively 150 and 152, secure the pivot arm 140 in place. A saddle 160 is fixed in pivotal relation to the aperture 143 by means of a bolt 161 and a washer nut and cotter pin arrangement, cumulatively 162. The saddle 160 receives the upper looped end 164 of a counter balance weight arm 165, with the lower end of the arm 165 receiving a plurality of weights 166 maintained in position, again by a conventional nut, bolt, and cotter pin arrangement, cumulatively 167. An identical counter balancing arrangement is provided on the opposite side of the frame through the use of a pivot arm 140', the weights 166', the arm 165', and the shoulder bolts 136', and the associated nuts, bolts, saddles, etc.

It should be noted that the channels 180, 182 and 184 are maintained in juxtaposition so as to thereby maintain the panels 50, 52 and 54 in end-to-end relationship by a spring means 200. This spring means includes a pair of springs 202 and 204 joined together by a turn buckle 206. The outer free ends of the spring 200 and of the spring 204 are fixed to the inner ends of the respective channels 180 and 184 by means of bolts 210 and 212 which pass through threaded apertures 214 and 216 in the channel members 180 and 184. The springs are essentially "stretched" to insure the side-to-side engagement of the panels 50, 52 and 54, while still permitting lateral expansion thereof.

Furthermore, a group of screws 230 are provided, which screws extend vertically, pass through bolts and through the threaded apertures 58 and into engagement with the sleeves 90 carried on each of the shoulder bolts 68. In this manner, by adjustment of these screws and the bearing thereof against the sleeves 90, proper vertical adjustment of the panels can be obtained in an exact manner.

An image layer made in accordance herewith would be previously formed of suitable size to be fixed on the panels 50, 52, and 54 with the respective image sections preferably carrying aligning markings whereby the field sections can be perfectly aligned horizontally with one another so that the lineations or lines thereon extend properly across the entire viewing panel whereby they can be shifted behind the lenticular screen to present the desired optical effect.

Once the unit shown in FIGURE 4 has been completely assembled as described above, the same appears as shown in FIGURE 6. It is this unit which is suspended in the housing 2 of FIGURE 1, and which was hereinabove designated by the numeral 8.

The unit 8, as shown in FIGURE 1, has its rear frame 62 fixed in position, but due to the arrangement with the pivotal arms 140, the forward panels thereof, namely, the panels 50, 52 and 54, are vertically movable with respect to the rear frame 62. In other words, frame 60 is, in essence, movable with respect to the frame 62. To achieve the desired movement, an operating mechanism generally designated by the numeral 300 is incorporated. This operating mechanism includes the motor 10 of FIGURE 1 and the drive means 12 of FIGURE 1. It further includes a pair of lever members 302, each of which carries an abutment 306 and 308 respectively, thereon. The outer ends of the levers 302 and 304 are pivotally mounted as at 310 and 312 to a suitable base support.

The drive mechanism 12 is best shown in FIGURE 8. This drive mechanism is directly operated by the motor shaft 318 which has a pair of mutilated gears 320 and 322 fixed thereon. The mutilated gear 320 has teeth 320a, 320b, etc., extending about half of the periphery thereof, and similarly the gear 322 has teeth 322a, 322b, etc., extending about half of the periphery thereof. The teeth on the gear 320 extend over that half of the periphery opposite the peripheral portion of the gear 322 which has no teeth thereon. The gears 320 and 322 still rotate simultaneously. A bevel gear 340 is disposed vertically above the respective gears 320 and 322, and so located as to cooperate with the sets of teeth on the respective gears 320 and 322, depending on which set is positioned for engagement therewith at any particular instance.

As shown in FIGURE 8, the teeth of gear 322 are in engagement with the teeth of bevel gear 340, but after a quarter revolution, it should be apparent that the teeth of the gear 320 will be in engagement therewith. The gear 340 is fixed to a screw shaft 344 which threads into a housing 346 fixed on support 316, and the housing contains a reciprocally movable nut 347 therein. As the gear 340 is rotated in one direction, the upper end of the shaft 348, secured to such nut, is raised, and as the gear 340 is rotated in the opposite direction, the shaft 348 descends. The upper end of shaft 348, as shown in FIGURE 7, carries a cap 350 thereon, which cap engages the inner ends of the respective levers 304 and 302. Thus, with rotation of the motor 10, the gears 320 and 322 are driven, and in turn, the gear 340 is driven first in one direction and then in the opposite direction. As driven in one direction, the gear 340 causes continuous upward movement of the inner ends of the respective levers, and in turn, upward movement of the respective panels by virtue of the lifting action on frame 60 by the abutments 306 and 308. After one-half a turn, the motor rotates the gear 340 in the opposite direction, and in turn the shaft 348 descends, thereby continuously lowering the inner ends of the respective levers 302, and in turn, thereby lowering the frame 60. There is thus provided a continuous scanning movement from a lowermost first position to an uppermost second position, and a continuous return from the uppermost second position to the lowermost first position, which raising and lowering is repeated with continued operation of the motor.

Now, when the image layer or element and the lenticular screen are assembled in the final arrangement as shown in FIGURE 1, then at any given instance, the operation may well be as shown in FIGURE 9. Here, in an enlarged illustration, one lenticle 6a of the lenticular screen 6 is presented in front of an image layer constructed in accordance herewith, which image layer is adapted to be moved by the assembly just described. Light reflected from the image layer would pass to the lenticle 6a, and then outwardly along the lines L1 and L2. The resolution of the lentical or lens at the focal plane, namely, at the plane of the image, would be of the order of the width of one particular image section within one field section—as shown by the image x-6 within the field section b. As the image moved, however, the lenticle 6a would essentially be in focus with the next adjacent image section x-7 at a following instance and, thereafter, with continued movement of the image element, the lenticle 6a would be in focal alignment with the next image section. There would, in essence, be a successive series of images being projected through the lenticle 6a, but this successive series would be projected at such a rate as to create in the mind of the viewer a prolonged presentation of the same image. As the image layer moved past the image section x-8 of section b, it would move into the image x-1 of section a, as shown in FIGURE 9. A new image would then be presented to the viewer, but this image would not be instantaneous, and instead, continued movement would merely place the respective images x-2, x-3, x-4, etc. of section a in focal alignment with the lenticle 6a. This operation would be continued as the image layer moves whereby the lenticle 6a scans a series of sections a, b, and c, therebehind, according to the example used herein, and whereby during the scanning operation, there are in fact, a plurality of images presented to the viewer, although he visually comprehends only the three particular images or presentations desired.

Although the preceding explanation of the respective filed sections of an image layer constructed in accordance herewith is believed to be accurate, there is, as indicated above, possibly some overlap between the respective image sections within each field section. This overlap, however, does not present a problem because the relative movement between the lenticular screen and the image layer in the final display is essentially the same as the relative movement between the lenticular screen and the original negative in the camera during the time that the original negative is being made.

In the illustrated embodiment, the field sections are naturally elongated and disposed in parallel relation to one another. This parallel disposition has been assumed to be in the horizontal direction since the lenticular screen is shown as having its elongated parallel lenticles extending horizontally. However, the lenticular screen can be disposed with its lenticles disposed vertically and in turn the image field sections can extend vertically. With the vertical disposition, though, the support for the respective image and screen elements would differ so that the movable element was permitted sufficient freedom to move relative to the other element. Similarly, the lenticles of the screen face inwardly as shown, but they can face outwardly. The inward disposition, however, facilitates cleaning the outer surface and prevents deterioration and destruction of the most significant optical surfaces.

The lenticular screen element 6 shown in FIGURE 1 is preferably formed with slots in the upper part thereof so that it can be suspended from a frame 61 identical with the frame 60 and so that it can receive a single channel member identical with an integral formation of the channel members 180, 182 and 184. More specifically, the lenticular screen is preferably supported in position in the same manner as the panels 50, 52 and 54 with rollers, bolts, sleeves and the like corresponding to rollers 100–102, 100a–102a, shoulder bolts 68, sleeves 90, and cooperating bolts being used to thus permit both lateral and vertical expansion and contraction of the lenticular screen. Preferably adjustment bolts, such as bolt 230 and threaded apertures, such as apertures 58 are utilized with the screen to permit proper adjustment of the position of the lenticular screen element. Further, the screen element 6 is preferably formed in three sections corresponding to the sections 50, 52 and 54 of the image element, and the screen sections are biased together in end to end relation by a spring means like spring means 200.

An attendant advantage to the present invention is the larger viewing angle which is given to an observer. More specifically, if the observer is so located that he does not receive rays parallel to the lines L1 and L2, but instead, receives rays at some angle thereto, this merely means that the lenticle is then focusing on a different image section for that viewer depending upon his position. He may well see the same image as being seen by the observer first mentioned, or on the contrary, he may see an image from another image section, i.e., the section a or the section c. In any event, however, the image is clearly presented, and he obtains the effect of the scanning as started from his point of view. There is, accordingly, a substantially wider practical viewing angle for a unit constructed in accordance herewith than any viewing angle which could be achieved with prior art constructions. As should be apparent, the same advantage in this regard is obtained whether the screen lenticals face inwardly or outwardly since the optical characteristics are the same in each instance.

Another factor deserving brief consideration is the amount of relative movement between the lenticular screen element and the image element of an apparatus constructed in accordance herewith. For exemplary purposes, it was assumed above that the apparatus would make three different presentations, but it was noted that two presentations could be made and/or that four presentations could be made. In this latter regard, it will be understood that the limit on the number of presentations depends on the resolution capabilities of the respective taking and viewing lenticular screens. The better the resolution, the greater the number of image sections or lines that can be put behind each lenticle of the screen being used.

The movement of one element with respect to the other is, in any event, at least equal to the width of one lenticle in the ultimate apparatus. Preferably, however, in the ultimate apparatus, the movement is through a distance in any one direction equal to a multiple of the lenticle width. This permits equal time exposure to an observer of any given presentation made by the apparatus. It will be appreciated that if a given final apparatus is to present displays of a series of advertisements, for example, then the time of exposure for any given presentation can be varied depending upon the width of the field sections in the image layer or element for the presentation. In other words, while it was assumed above that three presentations would be made and that each presentation would be given an equal time exposure to a viewer at a given location, the field sections in the image layer corresponding to one presentation could be made wider than the field sections for another or other presentations, whereby a longer presentation of one advertisement or display would result. This variation in "time of presentation" could be achieved by changing the width of the field sections while the initial negative was being made in the camera.

Having now described the preferred embodiments of the invention in considerable detail, and having explained the operation thereof, it should be apparent that the objects set forth at the outset of the present specification have been successively achieved.

Accordingly, what is claimed is:

1. A display apparatus comprising:
   (a) an image element having a plurality of successively adjacent elongated parallel field sections thereon, each of said field sections having a plurality of image sections therein, each image section in each field section carrying images of the same field, each field section being bordered by field sections carrying image sections of a different field therein;
   (b) a lenticular screen element disposed forward of said image element and having the longitudinal axes of the lenticles thereof disposed at least substantially parallel to the longitudinal axes of said field sections;
   (c) means for moving one of said elements with respect to the other to thereby change the presentation from one display to another;
   (d) said means for moving including cooperating gear means for continuously moving said one element along a predescribed and periodically reversing path;
   (e) said image element and said lenticular screen element being formed of materials having substantially the same coefficients of thermal expansion;
   (f) first frame means engaging said image element;
   (g) second frame means engaging said screen element;
   (h) said cooperating gear means acting on said frame means engaging said one element to move the same relative to the other frame means and thereby move said one element with respect to the other; and,
   (i) each of said frame means including means to permit expansion of the element engaged thereby while maintaining alignment between the respective elements.

2. A display apparatus as defined in claim 1 wherein said gear means comprise first and second mutilated gears having teeth extending over respectively opposite semi-peripheries thereof, a further gear meshing with the teeth on said mutilated gears, and screw means responsive to rotation of said further gear and wherein said means for moving further includes lever means cooperating with said screw means and engaging said frame means engaging said one element.

3. A display apparatus as defined in claim 1 wherein said first frame means comprises a first frame element, a second frame element, means mounting said second frame element, for vertical movement with respect to said first frame element, and wherein said image element comprises panel means supported by said second frame element for lateral and vertical movement with respect thereto upon expansion or contraction resulting from environmental conditions, and a film member carrying said field sections thereon, said film member being mounted on said panel means.

4. A display apparatus as defined in claim 3 wherein said panel means comprises a plurality of panels and wherein said film member comprises a plurality of sections mounted on respective of said panels.

5. A display apparatus as defined in claim 3 and further including channel means and pins engaging said panel means to support the same on said second frame for said lateral and vertical movement.

6. A display apparatus as defined in claim 5 wherein said panel means comprises a plurality of panels, wherein said channel means comprises a plurality of channels, and wherein said apparatus further includes spring means interconnecting said channels and urging said panels into side-by-side relation.

7. A display apparatus as defined in claim 3 and further including roller means engaging said panel means and carried by said second frame to permit vertical movement of said panel means with respect thereto, and pin and slot means supporting said panel means on said second frame to permit lateral movement of said panel means with respect to said second frame.

8. A display apparatus as defined in claim 7 wherein said means mounting said second frame element for vertical movement with respect to said first frame element comprises arm means mounted for pivotal movement on said second frame element and cooperating with said first frame element, and means for counter balancing said first frame element, said last mentioned means cooperating with said arm means.

References Cited by the Examiner

UNITED STATES PATENTS

| | | | |
|---|---|---|---|
| 395,298 | 12/1888 | Swanson | 74—74 X |
| 761,679 | 9/1904 | Ives | 96—40 |
| 829,902 | 8/1906 | Urry | 40—137 |
| 1,475,430 | 11/1923 | Curwen | 40—137 |
| 2,101,034 | 12/1937 | Meuche | 40—28 |
| 2,177,417 | 10/1939 | Eggert | 96—40 |
| 2,268,351 | 12/1941 | Tanaka | 40—132 X |
| 2,432,896 | 12/1947 | Hatchner | 40—137 X |
| 2,514,814 | 7/1950 | Towne | 40—137 X |
| 2,815,310 | 12/1957 | Anderson. | |
| 3,000,125 | 9/1961 | Elvestrom | 40—137 |

EUGENE R. CAPOZIO, *Primary Examiner.*

H. F. ROSS, *Assistant Examiner.*